United States Patent
Swars

[11] Patent Number: 5,218,883
[45] Date of Patent: Jun. 15, 1993

[54] ASSEMBLED SHAFT AND PROCESS FOR PRODUCTION THEREOF

[75] Inventor: Helmut Swars, Bergisch Gladbach, Fed. Rep. of Germany

[73] Assignee: Mannesmann Aktiengesellschaft, Dusseldorf, Fed. Rep. of Germany

[21] Appl. No.: 793,487

[22] Filed: Nov. 13, 1991

Related U.S. Application Data

[63] Continuation of Ser. No. 595,752, Oct. 5, 1990, abandoned, which is a continuation of Ser. No. 307,409, Feb. 7, 1989, abandoned.

[30] Foreign Application Priority Data

Feb. 7, 1988 [DE] Fed. Rep. of Germany ....... 3803682

[51] Int. Cl.$^5$ .............................................. F16H 53/00
[52] U.S. Cl. ...................................... 74/567; 29/6.01; 29/888.08; 29/522.1; 403/26; 403/277
[58] Field of Search ............. 29/6.01, 888.08, 888.092, 29/888.1, 898.045, 898.062, 898.057, 898.07, 522.1, 523, 521; 74/567; 403/26, 277; 474/49, 110

[56] References Cited

U.S. PATENT DOCUMENTS

| | | | |
|---|---|---|---|
| 2,800,809 | 7/1957 | Pike | 29/6 X |
| 3,236,570 | 2/1966 | Satterthwaite | 29/898.07 X |
| 4,050,130 | 9/1977 | Pitner | 29/898.07 |
| 4,214,642 | 7/1980 | Dauvergne | 403/277 X |
| 4,299,583 | 11/1981 | Kraft et al. | 474/110 |
| 4,382,390 | 5/1983 | Jordan | 74/567 |
| 4,693,138 | 9/1987 | Hughes et al. | 29/156.4 R X |
| 4,761,870 | 8/1988 | Urano | 29/156.4 R X |
| 4,781,076 | 11/1988 | Hartnett et al. | 29/432 X |

FOREIGN PATENT DOCUMENTS

| | | | |
|---|---|---|---|
| 189829 | 8/1986 | Japan | 29/6 |
| 189830 | 8/1986 | Japan | 29/6 |

*Primary Examiner*—Allan D. Herrmann
*Assistant Examiner*—William O. Trousdell
*Attorney, Agent, or Firm*—Anderson Kill Olick & Oshinsky

[57] ABSTRACT

A process for producing an assembled shaft consisting of a tubular member and driving or coupling elements attached to it, especially a camshaft or driveshaft in the case of which roller bearings with undivided outer bearing races are slid on and finish—assembled prior to the hydraulic expansion of the tubular member for the purpose of fixing the driving and coupling element, so that a light-weight shaft, especially a camshaft, with a low friction loss is produced.

10 Claims, 3 Drawing Sheets

ASSEMBLED SHAFT AND PROCESS FOR PRODUCTION THEREOF

This is a continuation application of Ser. No. 07/595,752, filed Oct. 5, 1990, now abandoned, which is a continuation application of Ser. No. 07/307,409, filed Feb. 7, 1989, now abandoned.

BACKGROUND OF THE INVENTION:

The invention relates to an assembled shaft comprising a tubular member and driving or coupling elements attached to it, especially a camshaft or driveshaft, as well as a process for producing such a shaft. Camshafts and driveshafts are only given by way of example, other applications also being possible.

Camshafts produced in accordance with the above mentioned process have already been described (P 36 33 435.9). Like conventional single-part shafts, camshafts of this type are guided in friction bearings whose size is determined by the diameter of the shaft member whose cross section is determined by existing strength requirements. It goes without saying that with the same boundary conditions, i.e. especially with a pre-determined torque load, the outer diameters of shafts with a hollow tube member are usually larger than those of solid shafts. Apart from the strength of the tube itself, it is especially the seat surface required for a friction-locking fit of the driving or coupling elements on the tubular member which is decisive. A further aspect in determining the size of the tubular member is the required inner diameter which must be free for inserting a probe for connecting the tubular member and the driving elements.

A disadvantage of the above mentioned shafts is that, because of the size of their bearings, they have an undesirably high friction loss. Furthermore, the problem of bearing lubrication is not solved satisfactorily because for supplying the lubricating oil special measures have to be taken inside the shaft which increase production costs.

SUMMARY OF THE INVENTION

It is therefore the object of the present invention to provide an improved type of an assembled shaft and a process for producing assembled shafts which permits the cost-effective production of shafts which have a reduced friction loss and which, at the same time, have been freed from the above-mentioned disadvantages regarding lubrication. The object is achieved in that, in bearing regions, roller bearings with at least undivided outer bearing races with initially loosely slid-on driving or coupling elements are finish—assembled and that subsequently by hydraulically expanding the inside of the tubular member in portions, the driving or coupling elements are fixed exclusively outside the axial regions taken up by the roller bearings. The type of shaft in accordance with the invention makes it possible to produce camshafts supported in roller bearings and the like with reduced friction losses and without there occurring any lubrication problems while keeping costs at an acceptable level, which costs are largely determined by the simple production method of using roller bearings with undivided outer races. In a particularly advantageous embodiment, the tubular member itself is designed as the inner bearing race, and even prior to sliding on the driving elements and the bearings in an alternating sequence, the bearing race regions may be machined, hardened and polished.

The fact alone that these process steps may be carried out on a smooth tubular member saves considerable costs. Because of the small radial size of the bearings, for example in the form of needle bearings, conventional friction bearings may quite easily be replaced in the case of shafts produced in accordance with the present invention. The inventive method of excluding the region of the inner bearing race from being subjected to pressure for joining purposes is particularly important in this case where finish—machining takes place prior to assembly.

The tubular member does not, of course, have to be in one part, but it may also be provided in an assembled design consisting of individual tubular pieces and sleeves, as corresponding to the current state of the art.

DETAILED DESCRIPTION OF THE PREFERRED EMBODIMENT

Figure 1:
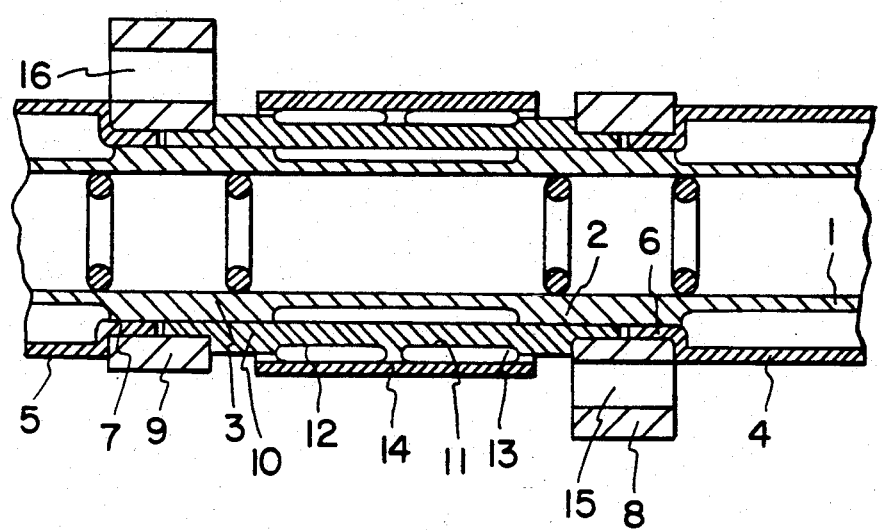
FIG. 1 illustrates a preferred embodiment of an assembled shaft pursuant to the invention.
Figure 2:
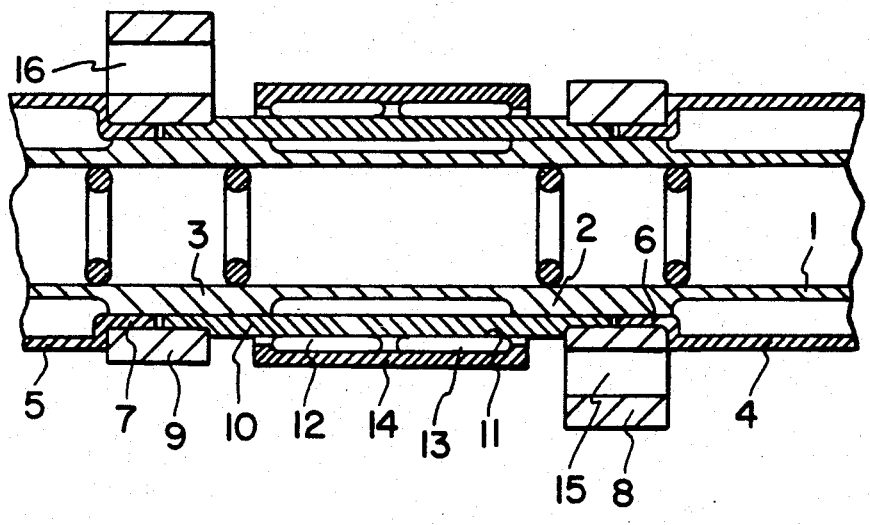
FIGS. 2-6 illustrate alternative embodiments of an assembled shaft pursuant to the invention.
Figure 3:
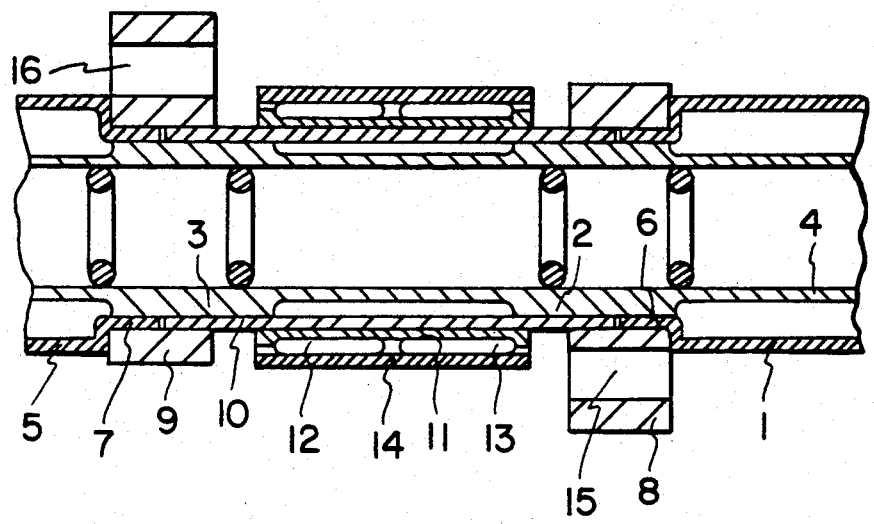
Figure 4:
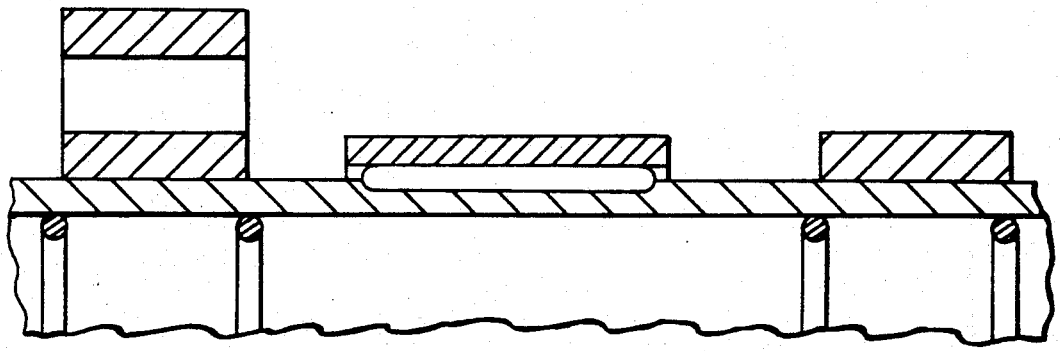
Figure 5:
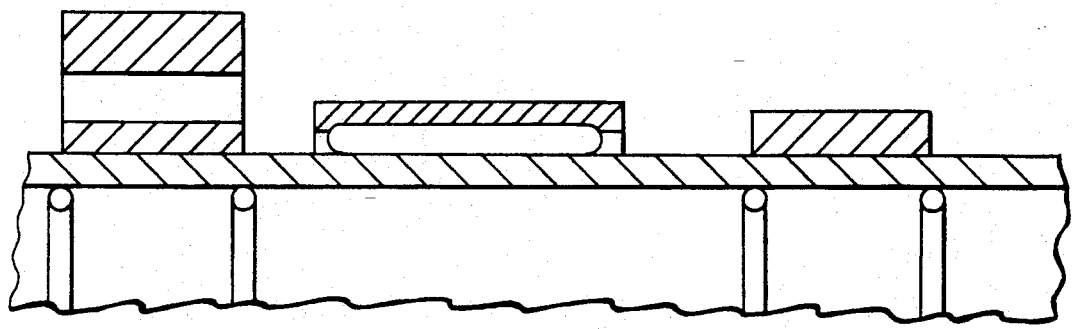
Figure 6:
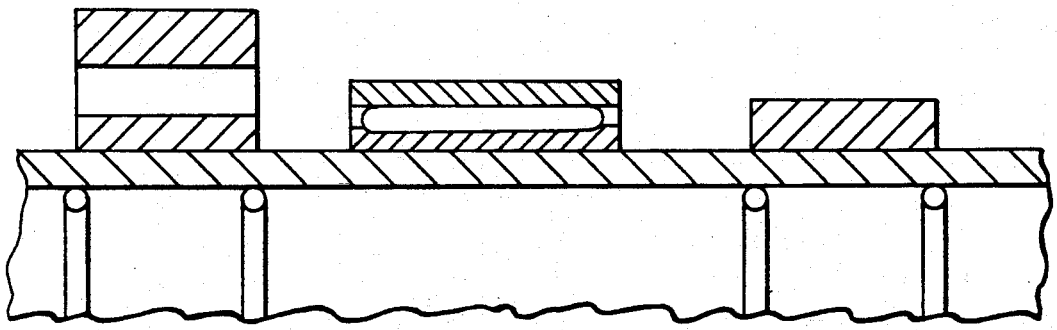

FIG. 1 shows an inner tubular member 1 with individual thickened wall portions 2,3 onto which stepped sleeves 4,5 are slid which, with collar regions 6,7 with reduced diameters, engage underneath two driving elements 8,9 in the form of cams offset relative to each other by 90°. An outer tubular member 10 has been slid onto the inner tubular member 1 between the sleeves 4,5 and is connected to it in a force-locking way by radially expanding the inner tubular member in the regions pre-determined by sealing rings as indicated. At the outer tubular member 10, there has been turned in a bearing track 11 which at the same time serves to axially secure needle bearings 12,13 arranged in two rows. These are held by an outer bearing race 14 whose inner diameter is smaller than the diameter of the driving elements 8,9 in their largest size. Underneath the raised cam portions the driving elements 8,9 comprise the apertures 15,16 for weight saving purposes.

While the invention has been illustrated and described as embodied in an assembled shaft and process for production thereof, it is not intended to be limited to the details shown, since various modifications and structural changes may be made without departing in any way from the spirit of the present invention.

Without further analysis, the foregoing will so fully reveal the gist of the present invention that others can, by applications without omitting features that, from the standpoint of prior art, fairly constitute essential characteristics of the generic or specific aspect of this invention.

What is claimed as new and desired to be protected by letters patent is set forth in the appended claims.

1. An assembled shaft, comprising: a tubular member expandable by internal pressure;
   at least two driving or coupling elements having bores and being mounted on said tubular member in axially spaced relation so that expanded parts of said tubular member within said bores and closely engaging said bores fix said elements to said tubular member, said tubular member having an unexpanded part between said expanded parts; an inner bearing race on said unexpanded part;

roller bearing elements arranged so as to surround said inner bearing race and be in rolling contact therewith; and a one-piece outer bearing race arranged so as to surround said rolling bearing elements and so as to be in rolling contact therewith.

2. An assembled shaft according to claim 1, wherein said inner bearing race is formed directly on an external surface portion of said unexpanded part of said tubular member.

3. An assembled shaft according to claim 2, wherein said external surface portion forming said inner bear race has a diameter smaller than that of external surface portions of said tubular member immediately adjacent to said inner bearing race.

4. An assembled shaft according to claim 1, and further comprising a separate member press-fit on said unexpanded part of said tubular member, said inner bearing race being formed on said separate member.

5. An assembled shaft according to claim 1, wherein at least two side-by-side rows of roller bearing elements are mounted on said inner bearing race.

6. An assembled shaft according to claim 1, wherein at least some of said driving and coupling elements are cams.

7. An assembled shaft according to claim 1, wherein at least some of said driving and coupling elements are gears.

8. An assembled shaft, comprising: an inner tubular member expandable by internal pressures;

an outer tubular member expandable by internal pressure and arranged so as to surround said inner tubular member;

two driving or coupling elements having bores and being mounted on said outer tubular member in axially spaced relation so that expanded parts of said outer tubular member within said bores and closely engaging said bores fix said elements to said outer tubular member, said inner tubular member having expanded parts within and closely engaging said expanded parts of said outer tubular member so as to fix said inner and outer tubular members together, said outer tubular member having an unexpanded part between said expanded parts of said outer tubular member;

an inner bearing race on said unexpanded part of said outer tubular member;

rolling bearing elements arranged so as to surround said inner bearing race and be in rolling contact therewith; and a one-piece outer bearing race arranged so as to surround said rolling bearing elements and be in rolling contact therewith.

9. An assembled shaft according to claim 8, wherein said outer tubular member is comprised of a plurality of stepped sleeves arranged end-to-end on said inner tubular member, each stepped sleeve having a central part with a relatively greater diameter and end parts of relatively smaller diameter, said unexpanded part of said outer tubular member being formed on a central part of one of said sleeves, and end parts of two adjacent of said sleeves being received in said bore of each of said driving or coupling elements.

10. An assembled shaft according to claim 9, wherein said inner bearing race is formed directly on an external surface portion of the central part of one of said tubular members, said external surface portion forming said inner bearing race having a diameter smaller than external surface portions of said central part of said sleeve immediately adjacent to said inner bearing race.

* * * * *